US012738152B2

(12) United States Patent
Gupta et al.

(10) Patent No.: US 12,738,152 B2
(45) Date of Patent: Sep. 15, 2026

(54) METHODS AND SYSTEMS FOR PROVIDING ROADSIDE DRONE SERVICE

(71) Applicant: Toyota Motor Engineering & Manufacturing North America, Inc., Plano, TX (US)

(72) Inventors: Rohit Gupta, Santa Clara, CA (US); Akila C. Ganlath, Agua Dulce, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 533 days.

(21) Appl. No.: 17/518,079

(22) Filed: Nov. 3, 2021

(65) Prior Publication Data

US 2023/0135603 A1 May 4, 2023

(51) Int. Cl.

*B64U 101/00* (2023.01)
*B64U 10/13* (2023.01)
*G06Q 30/00* (2023.01)
*G06Q 50/40* (2024.01)
*G08G 1/01* (2006.01)

(52) U.S. Cl.

CPC ........... *G08G 1/0116* (2013.01); *B64U 10/13* (2023.01); *G06Q 30/00* (2013.01); *G06Q 50/40* (2024.01); *G08G 1/0129* (2013.01); *B64U 2101/00* (2023.01)

(58) Field of Classification Search

CPC ...... B64C 39/024; G06Q 30/00; G06Q 50/30; G08G 1/0112; G08G 1/0116; G08G 1/012; G08G 1/0129; G08G 1/0141; G08G 1/0145; G08G 1/0955; B64U 2101/00

See application file for complete search history.

(56) References Cited

U.S. PATENT DOCUMENTS

| | | | | |
|---|---|---|---|---|
| 9,915,956 | B2 | 3/2018 | Bokeno et al. | |
| 9,940,842 | B2 | 4/2018 | Shaw et al. | |
| 10,467,885 | B2 | 11/2019 | Trundle et al. | |
| 2016/0035224 | A1* | 2/2016 | Yang | G08G 5/0069 701/23 |
| 2017/0286887 | A1* | 10/2017 | Moran | H04B 7/18504 |
| 2018/0174448 | A1 | 6/2018 | Gomez Gutierrez et al. | |

(Continued)

FOREIGN PATENT DOCUMENTS

| | | | |
|---|---|---|---|
| CN | 105825283 | A | 8/2016 |
| CN | 108205903 | A | 6/2018 |

(Continued)

*Primary Examiner* — Matthew J. Reda

(74) *Attorney, Agent, or Firm* — DINSMORE & SHOHL LLP

(57) ABSTRACT

A method comprises receiving, at a vehicle system of a vehicle, sensor data from one or more sensors; detecting an object based on the sensor data; determining whether a dynamic map maintained by a remote computing device includes the detected object; upon determination that the dynamic map includes the detected object, determining a remaining time-to-live associated with the detected object based on data associated with the dynamic map; and transmitting data about the detected object to the remote computing device if the determined remaining time-to-live associated with the detected object is less than a predetermined threshold time.

20 Claims, 8 Drawing Sheets

(56) References Cited

U.S. PATENT DOCUMENTS

| | | | |
|---|---|---|---|
| 2018/0284770 | A1* | 10/2018 | VandenBerg, III ...... G08G 1/20 |
| 2018/0319494 | A1 | 11/2018 | Aflatoon |
| 2019/0005812 | A1* | 1/2019 | Matus .................. G06V 20/584 |
| 2019/0073624 | A1* | 3/2019 | Schaeffer ........... G06Q 30/0643 |
| 2019/0172278 | A1* | 6/2019 | Castro Duran ...... G07C 5/0808 |
| 2019/0193856 | A1* | 6/2019 | Prager ...................... B64D 1/22 |
| 2019/0196512 | A1* | 6/2019 | Blake ................... G05D 1/0094 |
| 2020/0118444 | A1* | 4/2020 | Wen ........................ H04L 67/51 |
| 2020/0239031 | A1* | 7/2020 | Ran ...................... G08G 1/0125 |
| 2020/0278689 | A1 | 9/2020 | Larson et al. |
| 2021/0201683 | A1* | 7/2021 | van den Berg ........ G08G 1/202 |

FOREIGN PATENT DOCUMENTS

| | | | |
|---|---|---|---|
| CN | 105721609 | B | 5/2020 |
| IN | 202011009230 | A | 10/2020 |
| KR | 100883521 | B1 | 2/2009 |
| WO | 2014080388 | A2 | 5/2014 |
| WO | 2018004638 | A1 | 1/2018 |

* cited by examiner

METHODS AND SYSTEMS FOR PROVIDING ROADSIDE DRONE SERVICE

TECHNICAL FIELD

The present specification relates to drone service and more particularly to methods and systems for providing roadside drone service.

BACKGROUND

Unmanned aerial vehicles (which may be referred to herein as UAVs or drones) may provide a variety of services. In some examples, drones may provide roadside service to vehicles or personnel driving, working, or otherwise present at or near a road. However, arranging such drone service may be difficult and/or time consuming. Accordingly, a need exists for an improved method and system for providing roadside drone service.

SUMMARY

In an embodiment, a method may include receiving traffic data indicating current traffic states at one or more road locations, predicting a first road location where first roadside drone service is expected to be needed at a first future time based on the traffic data, and causing one or more unmanned aerial vehicles to travel to the first road location to perform the first roadside drone service.

In another embodiment, a remote computing device may include a processor configured to receive traffic data indicating current traffic states at one or more road locations, predict a first road location where first roadside drone service is expected to be needed at a first future time based on the traffic data, and cause one or more unmanned aerial vehicles to travel to the first road location to perform the first roadside drone service.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Drones may provide valuable roadside service to vehicles or roadside personnel. In particular, drones may be able to provide roadside service more quickly or efficiently than other ground vehicles. By flying to a location where roadside service is needed, drones may be able to avoid traffic that may be incurred by ground vehicles, thereby arriving more quickly than ground vehicles would be able to. In addition, drones may be able to take a more direct route to a location where service is needed, whereas ground vehicles are restricted to traveling along existing roads.

Drones may be able to provide a variety of roadside services including causing traffic breaks, issuing warnings to drivers about upcoming road conditions, bringing supplies or equipment to roadside personnel, and the like. These various services are discussed in further detail below.

While drones may be able to quickly provide roadside service, it may be difficult to arrange roadside drone service at the locations where it is needed. Individuals who may benefit from roadside drone service may not be aware of its availability or how to order the appropriate drone service. It may also be difficult to find the appropriate drones that are able to provide certain kinds of roadside service. Furthermore, by the time a drone arrives at a location to provide service, it may be too late for the drone service to be of maximum value.

The embodiments disclosed herein disclose a method and system of providing roadside drone service. As disclosed herein, a server may receive traffic data from traffic infrastructure (e.g., traffic cameras) and/or vehicles. This traffic data may indicate a state of road conditions or traffic conditions at a time that the data is gathered. The server may then use predictive technology to predict future road or traffic conditions based on the received traffic data and/or historical traffic data. The server may then identify any predicted future road or traffic conditions which may benefit from roadside drone service. The server may then identify one or more drones that are able to provide the appropriate roadside drone service and may automatically establish a contract with an owner or operator of the drones to provide the service. The drones may then be routed to the location where roadside drone service is desired in order to provide the service.

Figure 1:
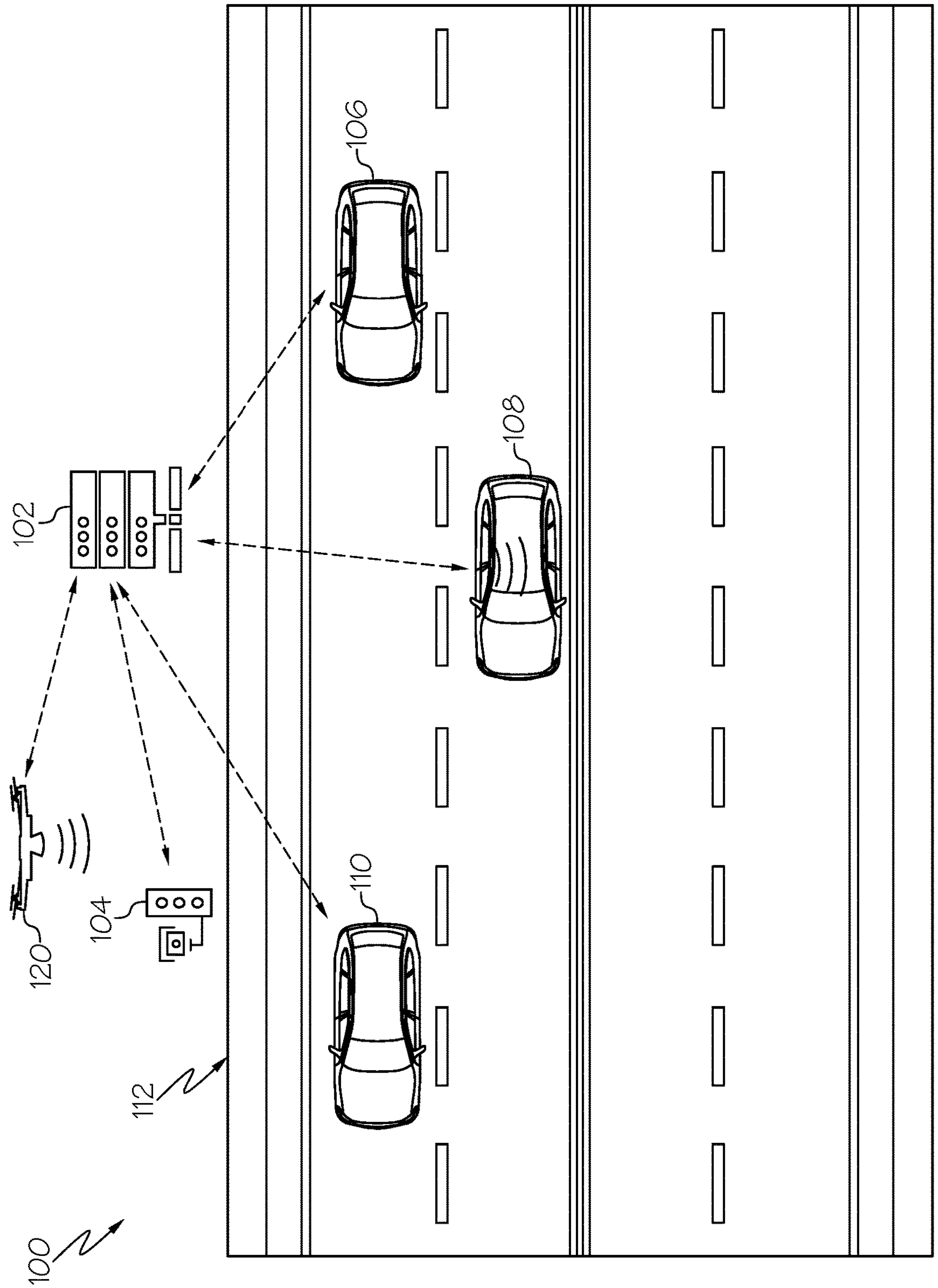
FIG. 1 schematically depicts a system for providing roadside drone service, according to one or more embodiments shown and described herein.

FIG. 1 schematically depicts a system for providing roadside drone service. A system 100 includes a remote computing device 102 (which may be referred to herein as a server) and at least one UAV 120. The server 102 may receive traffic data from traffic infrastructure (e.g., a traffic camera 104) and or one or more vehicles (e.g., vehicles 106, 108, 110) traveling along a road (e.g., the road 112). While FIG. 1 indicates a single traffic camera 104 and three vehicles 106, 108, 110, it should be understood that in other examples, the system 100 may include any number of traffic cameras or other types of traffic infrastructure and any number of vehicles. While the example of FIG. 1 illustrates the server 102 receiving traffic data associated with a single location, in other examples, the server 102 may receive traffic data from a plurality of locations.

In the illustrated example, the traffic camera 104 and the vehicles 106, 108, 110 are communicatively coupled to the server 102. In embodiments, the vehicles 106, 108, 110 may be connected vehicles that are able to communicate with external devices, such as the server 102. In some examples, the traffic camera 104 and the vehicles 106, 108, 110 may transmit data to the server 102 via a network.

In the illustrated example, the server 102 comprises a cloud computing device. In some examples, the server 102 may comprise a road-side unit (RSU) positioned near the road 112. In these examples, the system 100 may include any number of RSUs spaced along the road 112 such that each RSU covers a different service area. That is, as the vehicles 106, 108, 110 or other vehicles drive along the road 112, the vehicles may be in range of different RSUs at different times such that different RSUs provide coverage at different locations. Thus, as the vehicle 106, 108, 110 drive along the road 112, the vehicles may move between coverage areas of different RSUs.

In other examples, the server 102 may be another type of server or remote computing device and may be positioned remotely from the road 112. In some examples, the server 102 may be an edge server. In some examples, the server 102 may be a moving edge server, such as another vehicle. In some examples, the server 102 may be a cloud-based server.

The traffic data received by the server 102 may indicate positions and trajectories of vehicles and/or other road agents traveling along the road 112. The traffic data received by the server 102 may also include other data that may affect traffic such as road conditions (e.g., potholes or debris), weather conditions, or other factors. In some examples, the traffic data may comprise images or video captured by the traffic infrastructure 104 and/or the vehicles 106, 108, 110. In other examples, the traffic data may comprise other types of data, such as data captured by LiDAR sensors, RADAR sensors, optical sensors (e.g., cameras, laser sensors), proximity sensors, location sensors (e.g., GPS modules), and the like. In some examples, the traffic data received by the server 102 may comprise raw data captured by the traffic camera 104 and/or the vehicles 106, 108, 110. In other examples, the traffic camera 104 and/or the vehicles 106, 108, 110 may be compress, encode, extract features from, or otherwise process captured raw data before transmitting the processed data to the server 102.

The server 102 may be communicatively coupled to the UAV 120. When roadside drone service is needed at a particular location, the server 102 may transmit a signal to the UAV 120 to cause the UAV 120 to travel to the location to perform the roadside drone service, as disclosed herein. Upon completion of roadside drone service, the UAV 120 may transmit a signal to the server 102 indicating that a particular roadside drone service task has been completed.

Figure 2:
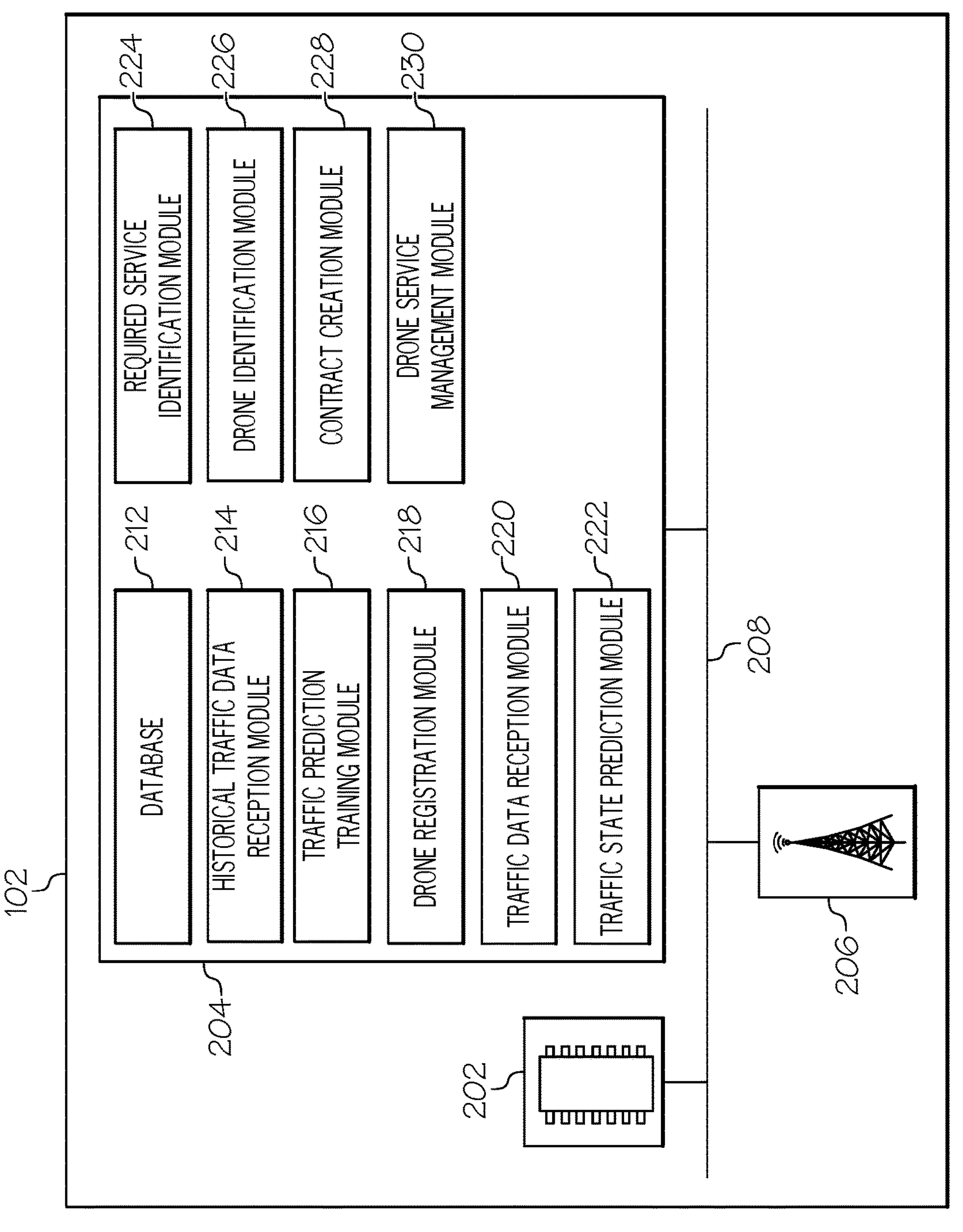
FIG. 2 depicts a schematic diagram of a remote computing device, according to one or more embodiments shown and described herein.

Now referring to FIG. 2, the server 102 comprises one or more processors 202, one or more memory modules 204, network interface hardware 206, and a communication path 208. The one or more processors 202 may be a controller, an integrated circuit, a microchip, a computer, or any other computing device. The one or more memory modules 204 may comprise RAM, ROM, flash memories, hard drives, or any device capable of storing machine readable and executable instructions such that the machine readable and executable instructions can be accessed by the one or more processors 202.

The network interface hardware 206 can be communicatively coupled to the communication path 208 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, Wi-Fi card, WiMax card, mobile communications hardware, near-field communication hardware, satellite communication hardware and/or any wired or wireless hardware for communicating with other networks and/or devices. The network interface hardware 206 of the server 102 may receive data from the traffic camera 104 and the vehicles 106, 108, 110 of FIG. 1.

The one or more memory modules 204 include a database 212, a historical traffic data reception module 214, a traffic prediction training module 216, a drone registration module 218, a traffic data reception module 220, a traffic state prediction module 222, a required service identification module 224, a drone identification module 226, a contract creation module 228, and a drone service management module 230. Each of the database 212, the historical traffic data reception module 214, the traffic prediction training module 216, the drone registration module 218, the traffic data reception module 220, the traffic state prediction module 222, the required service identification module 224, the drone identification module 226, the contract creation module 228, and the drone service management module 230 may be a program module in the form of operating systems, application program modules, and other program modules stored in the one or more memory modules 204. Such a program module may include, but is not limited to, routines, subroutines, programs, objects, components, data structures and the like for performing specific tasks or executing specific data types as will be described below.

The database 212 may store traffic data received by the server 102. The database 212 may also store other data received by and/or created by the server 102 that may be used by the one or more memory modules 204 and/or other components of the server 102, as discussed in further detail below.

The historical traffic data reception module 214 may receive historical traffic data associated with a plurality of vehicles. The historical traffic data received by the historical traffic data reception module 214 may be stored in the database 212. The historical traffic data received by the historical traffic data reception module 214 may be used as training data to train a traffic prediction model (which may be referred to herein as the model) to predict future traffic states based on current traffic states. Accordingly, the historical traffic data reception module 214 may receive data about a large number of traffic situations. The historical traffic data received by the historical traffic data reception module 214 may indicate positions, velocities, accelerations, trajectories, and other data associated with vehicles in a variety of locations at a variety of different times. The historical traffic data received by the historical traffic data reception module 214 may also include timestamps and locations associated with traffic data. As such, the historical traffic data may indicate how certain traffic situations at one location lead to other traffic situations at another location at a later time.

In embodiments, the historical traffic data reception module 214 may receive historical traffic data form a variety of sources. In some examples, the historical traffic data reception module 214 may receive historical traffic data from traffic infrastructure such as the traffic camera 104 of FIG. 1 and/or connected vehicles such as the vehicles 106, 108, 110 of FIG. 1. In other examples, the historical traffic data reception module 214 may receive historical traffic data from other sources. For example, the historical traffic data reception module 214 may receive historical traffic data from data repositories that collect traffic data (e.g., government agencies, auto manufacturers, universities, research labs, and the like).

Referring back to FIG. 2, the traffic prediction training module 216 may train the traffic prediction model to predict future traffic states based on the historic traffic data received by the historical traffic data reception module 214. That is, the historical traffic data reception module 214 may train the model to receive current traffic state at one or more second locations and predict future traffic states at one or more first locations (which may be the same locations as the second locations or different locations from the second locations). In some examples, the traffic prediction training module 216 trains the traffic prediction model using machine learning (e.g., using a neural network). In other examples, the traffic prediction training module 216 may train the model using other algorithms.

In addition, to predicting one or more future traffic states based on one or more current traffic states, the traffic prediction training module 216 may train the traffic prediction model to predict traffic states at certain locations based on a time and/or date. For example, the historical traffic data received by the historical traffic data reception module 214 may indicate that a certain stretch of road tends to have a traffic jam every weekday around 5:00 P.M. (e.g., rush hour traffic). As such, the traffic prediction training module 216 may train the model to predict that this stretch of road will have a traffic jam weekday at 5:00 P.M. Accordingly, the traffic prediction training module 216 may train the traffic prediction model to predict future traffic states at one or more locations based on current traffic states at one or more locations and based on general traffic tendencies at certain times and dates.

After the traffic prediction training module 216 trains the traffic prediction model, the parameters of the model may be stored in the database 212. As additional traffic data is received by the server 102, the traffic prediction training module 216 may continually update the model parameters based on the newly received traffic data.

Referring still to FIG. 2, the drone registration module 218 may receive registration information associated with drones, as disclosed herein. As discussed above, the server 102 may identify appropriate drones for performing certain roadside drone services. Accordingly, in order to perform this identification, the drone registration module 218 may receive data associated with drones that are able to perform different roadside services.

In embodiments, when an owner or operator of a drone wishes to make their drone available to perform roadside services, the owner/operator may register the drone with the server 102. In particular, the owner/operator may register a drone by providing registration information associated with the drone to the server 102. The registration information may be received by the drone registration module 218. The registration information associated with the drone may include specifications and performance capabilities of the drone. For example, the registration information may include the size of the drone, the top speed of the drone, the altitude that the drone is able to fly at, its payload capacity, any special equipment that the drone has, and the like. This information may be received by the drone registration module 218 and stored in the database 212.

In some examples, the registration information may include contract information specified by the owner/operator of the drone. For example, the registration information may include a minimum price that the owner/operator is willing to accept for performance of different services by the drone. This information may be used to create a contract for performance of roadside drone services, as discussed in further detail below. In some examples, the registration information may also include location information where the drone is typically housed. This may be used to determine proximity of drones to a location needing roadside drone service, as discussed in further detail below.

Referring still to FIG. 2, the traffic data reception module 220 may receive real-time traffic data associated with one or more locations. For example, the traffic data reception module 220 may receive traffic data from the traffic camera 104 of the connected vehicles 106, 108, 110 of FIG. 1. However, in other examples, the traffic data reception module 220 may receive traffic data from any number of traffic infrastructure, connected vehicles, or other sources.

The traffic data received by the traffic data reception module 220 may comprise a data captured by a variety of sensors, such as LiDAR sensors, RADAR sensors, optical sensors (e.g., cameras, laser sensors), proximity sensors, location sensors (e.g., GPS modules), and the like. The data received by the traffic data reception module 220 may indicate positions, velocities, accelerations, trajectories, and other data associated with vehicles and/or other road agents. In some examples, the traffic data received by the traffic data reception module 220 may also comprise other types of affecting traffic such as pot holes, animal or debris on the road, weather conditions, and the like. The traffic data received by the traffic data reception module 220 may indicate current traffic states at one or more locations.

Referring still to FIG. 2, the traffic state prediction module 222 may predict one or more future traffic states based on the traffic data received by the traffic data reception module 220. In particular, the traffic state prediction module 222 may utilize the traffic prediction module trained by the traffic prediction training module 216 to predict a future traffic state at one or more locations based on a current traffic state at one or more locations. In some examples, the traffic state prediction module 222 may predict future traffic states a certain time frame in the future (e.g., within the next half hour). In some examples, the traffic state prediction module 222 may also predict future traffic states at certain locations based on a time and date (e.g., the traffic state prediction module 222 may predict a traffic jam at a certain location because that location often has a traffic jam at 5:00 P.M. on weekdays).

Referring still to FIG. 2, the required service identification module 224 may identify one or more times and locations where roadside drone service is expected to be needed based on the future traffic states predicted by the traffic state prediction module 222. That is, the required service identification module 224 may identify certain traffic states or traffic situations predicted by the traffic state prediction module 222 for which drone service may be helpful and the locations thereof.

In embodiments, the database 212 may store data that associates certain types of traffic states with different types of roadside drone service may be helpful or desirable. In some examples, this information may be input by experts who may evaluate a variety of traffic states and determine whether different types of drone service would be helpful. Accordingly, the required service identification module 224 may determine whether any future traffic states predicted by the traffic state prediction module 222 match any traffic states identified as desiring roadside drone service stored in the database 212. Several examples of situations where drone service may be helpful are discussed below. However, it should be understood that this list is not exhaustive and the drone identification module 226 may identify other traffic states where drone service may be helpful not discussed herein.

Figure 3:
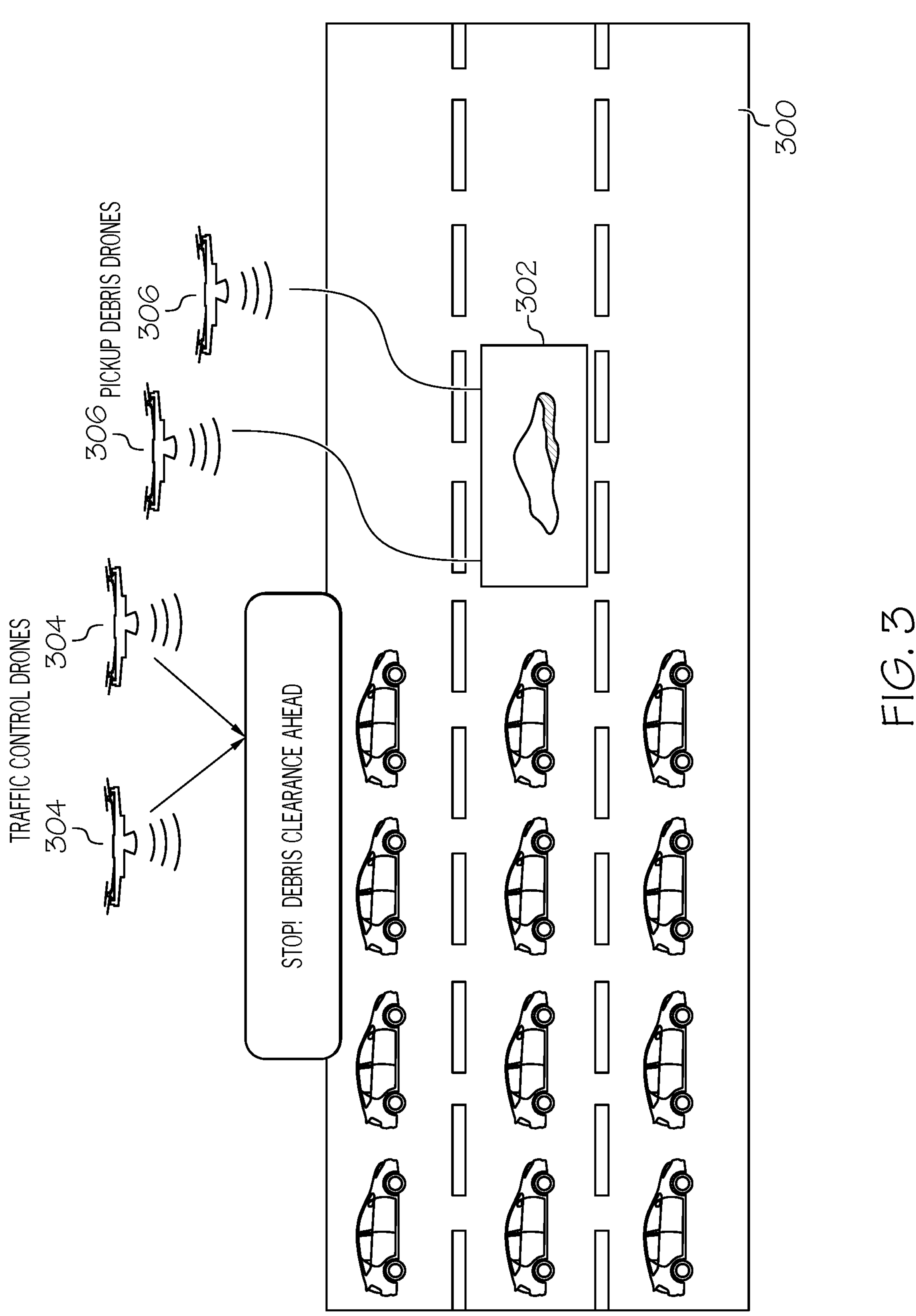
FIG. 3 depicts an example roadside drone service being performed by unmanned aerial vehicles, according to one or more embodiments shown and described herein.

FIG. 3 shows an example of roadside drone service that may be provided to remove debris from a road. In the example of FIG. 3, a road 300 may contain debris 302, which may cause traffic problems for oncoming vehicles. Accordingly, one or more drones may provide roadside drone service to remove the debris and/or warn approaching vehicles about the debris. In the example of FIG. 3, traffic control drones 304 may warn approaching vehicles about the debris 302 and pickup debris drones 306 may remove the debris 302 from the road. The traffic control drones 304 may output an audio and/or visual warning to approaching vehicles warning about the upcoming debris 302. The drones may output an audio warning by playing sound from external speakers. The drones may output a visual warning by displaying text, images, or other visual cues that can be seen by the drives to be warned. The visual warning may be displayed on a digital screen or other device carried by or part of the drones. The pickup debris drones 306 may have equipment that allows them to pick up and remove the debris 302 from the road (e.g., a mechanical arm).

Figure 4:
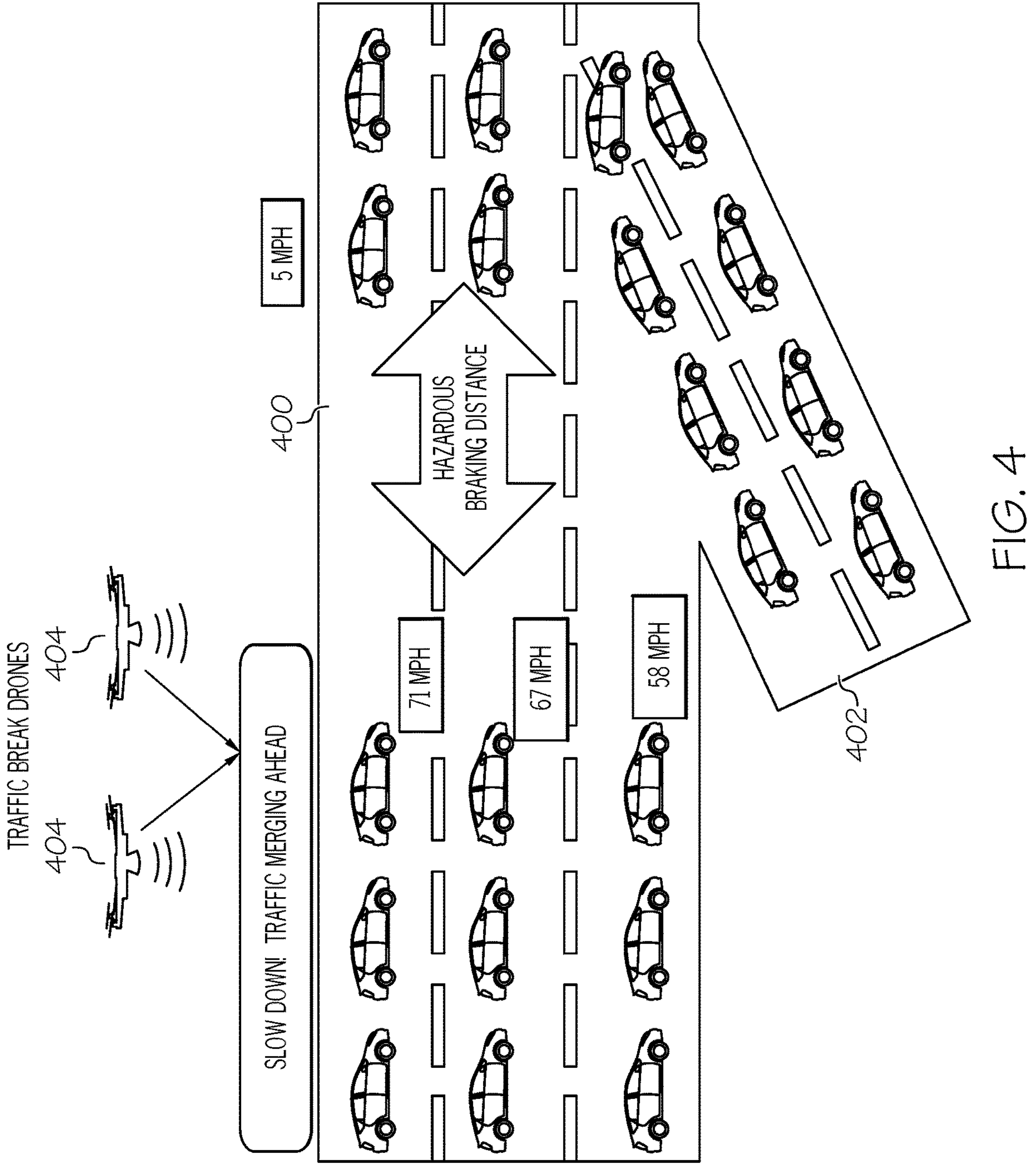
FIG. 4 depicts another example roadside drone service being performed by unmanned aerial vehicles, according to one or more embodiments shown and described herein.

FIG. 4 shows an example of roadside drone service that may be provided to create a traffic break to allow for vehicles to merge onto a road (e.g., at an entrance to an expressway). In the example of FIG. 4, a road 400 includes an on-ramp 402 that allows vehicles to merge onto the road 400. The merging traffic may create traffic congestion. Accordingly, traffic break drones 404 may create a traffic break along a portion of the road 400 leading up to the on-ramp 402. In particular, the traffic break drones 404 may provide an audio and/or visual warning for vehicles approaching the on-ramp 402 along the road 400 to slow down.

Figure 5:
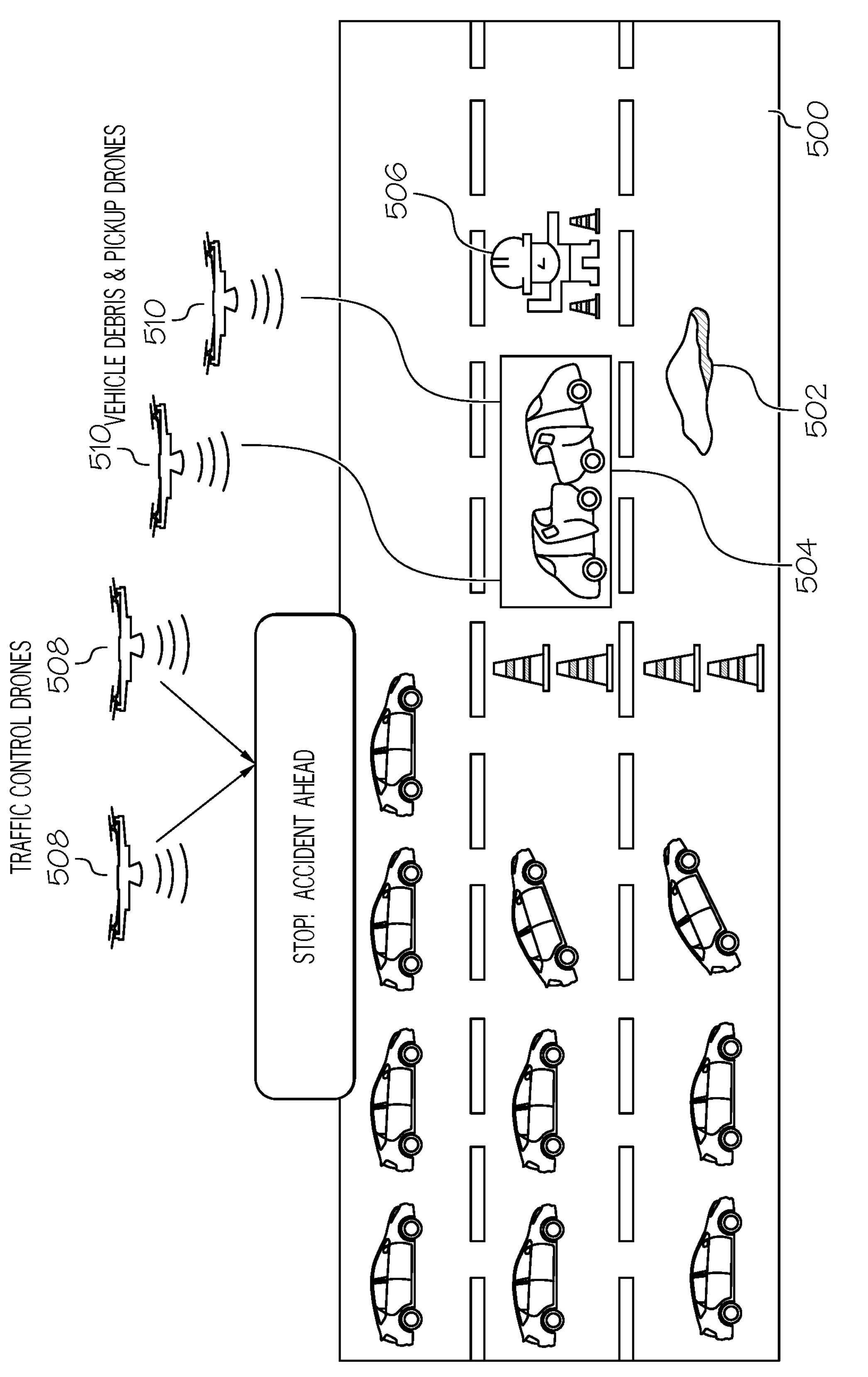
FIG. 5 depicts another example roadside drone service being performed by unmanned aerial vehicles, according to one or more embodiments shown and described herein.

FIG. 5 shows an example of roadside drone service that may be provided in cooperation with roadside personnel. In a complex situation, it may be desirable for drones to work cooperatively with roadside personnel to best direct traffic and otherwise address the traffic situation. In the example of FIG. 5, a road 500 contains debris 502 and an accident 504. One or more emergency personnel 506 may be directing traffic, dealing with the debris, and/or assisting with the accident 504. One or more traffic control drones 508 may help control traffic by outputting an audio and/or visual warning to approaching vehicles about the debris 502 and/or the accident 504. One or more vehicle and debris pickup drones 510 may assist with the removal of the debris 502 and/or providing equipment, medical supplies, or other provisions to assist with the accident 504. The traffic control drones 508 and the debris pickup drones may work cooperatively with the emergency personnel 506 to assist with the debris 502 and/or the accident 504.

Figure 8:
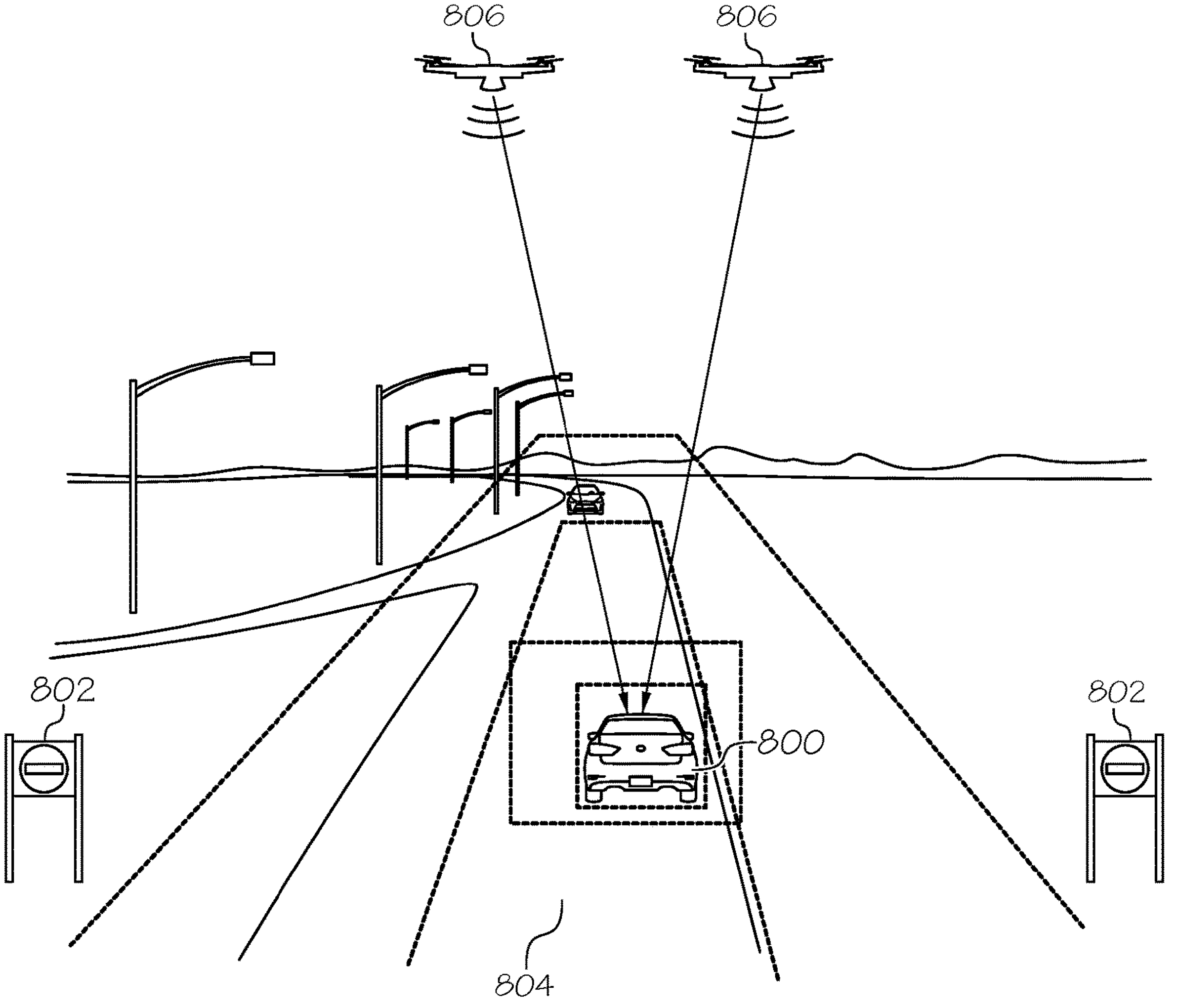
FIG. 8 depicts an example of roadside drone service being performed by an unmanned aerial vehicle according to one or more embodiments shown and described herein.

FIG. 8 shows an example of roadside drone service that may be provided to warn a wrong way driver. In the example of FIG. 8, a vehicle 800 has ignored do not enter signs 802 and is driving the wrong way along a road 804. Accordingly, drones 806 can issue an audio and/or visual warning to the vehicle 800 indicating that the vehicle 800 is driving the wrong way. In some examples, the drones 806 or other drones can also issue an audio and/or visual warning to other drivers in the vicinity of or approaching the vehicle 800 to be aware of a wrong way driver. In some examples, the required service identification module 224 may identify a location associated with a predicted traffic state where a vehicle may be driving the wrong way along a road and a drone may be dispatched to that location to warn the wrong way vehicle.

In addition to the examples discussed above, a variety of other types of roadside drone service may be provided. Non-limiting examples of other roadside drone services that may be provided may include bringing tools, medical supplies, or equipment to motorists, emergency personnel, construction workers or others; helping police monitor traffic; helping repair roads; or deploying and removing traffic cones.

Referring back to FIG. 2, the drone identification module 226 may identify one or more drones that are able to provide roadside drone service identified by the required service identification module 224. In particular, the drone identification module 226 may identify drones that have been registered with the drone registration module 218 that are able to provide roadside drone service identified by the required service identification module 224.

As discussed above, drones may be registered with the server 102 and the drone registration module 218 may receive information about the capabilities of the registered drones. As also discussed above, the required service identification module 224 may identify different types of roadside drone service that may be desirable at different locations. The required service identification module 224 may identify capabilities of drones that may be needed to provide different types of roadside drone service. For example, drones with certain equipment (e.g., a mechanical arm) may be needed to remove debris and drones with a display and/or external speakers may be needed to alert vehicles about a traffic break. As such, the drone identification module 226 may match different types of roadside drone service requiring drones with certain capabilities to drones registered with the drone registration module 218 that have those capabilities. As such, the drone identification module 226 may identify drones that are able to provide roadside drone services identified by the required service identification module 224.

The contract creation module 228 may automatically establish a contract with one or more drones identified by the drone identification module 226 to provide a roadside drone service identified by the required service identification module 224. In some examples, after the drone identification module 226 identifies a drone that has the capabilities to provide the roadside drone service identified by the required service identification module 224, the contract creation module 228 may transmit a notification to the owner/operator of the one or more identified drones indicating that a contract has been established for the drone to provide a particular roadside drone services. In these examples, the owner/operator of the drone agrees to allow the server 102 to automatically establish a contract when roadside drone service for which the drone is suitable to provide is available. As such, the contract creation module 228 may automatically establish the contract with the owner/operator of the drone for the drone to provide the service.

In other examples, the contract creation module 228 may transmit a request to the owner/operator to accept a contract for the drone to provide the service. The owner/operator may then either accept or reject the contract offer (e.g., through a website or smartphone app). If the contract offer is accepted, then the contract may be formed. If the offer is rejected, then the server 102 may attempt to find another drone to provide the service.

In embodiments, a contract formed by the contract creation module 228 may specify a roadside drone service to be performed by a drone and a price to be paid for the provision of the service. In some examples, the registration information received by the drone registration module 218 may indicate a minimum price that the owner/operator of a drone is willing to accept for different services. In some examples, the server 102 may have agreement with government agencies or private organizations to provide drone service for certain traffic situations. For example, the server 102 may have an agreement with a municipality to provide roadside drone service to implement traffic breaks when traffic jams are predicted. In these examples, these public or private entities may set a maximum amount that they are willing to pay for the provision of different roadside drone services. Accordingly, the contract creation module 228 may match a registered drone that is able to provide a roadside drone service for a price that an entity is willing to pay for that service.

In embodiments, if the drone identification module 226 identifies more than one drone that is able to provide a particular roadside drone service identified by the required service identification module 224, the contract creation module 228 may select a drone to perform the roadside drone service, and establish a contract accordingly, based on one or more selection criteria. In some examples, the contract creation module 228 may select the drone that is willing to provide the roadside drone service for the lowest cost. In other examples, the contract creation module 228 may select the drone that is able to arrive at the location of the roadside drone service most quickly. In other examples, the contract creation module 228 may select the drone that is able to provide the highest quality of roadside drone service (e.g., the drone that has the most sophisticated equipment). In other examples, the contract creation module 228 may use other criteria to select a drone to perform a roadside drone service.

Referring still to FIG. 2, the drone service management module 230 may cause a selected drone to perform a roadside drone service. In particular, after the contract creation module 228 has formed a contract for a drone identified by the drone identification module 226 to perform a roadside drone service identified by the required service identification module 224, the drone service management module 230 may transmit a signal to the identified drone to cause the drone to travel to the location where roadside drone service is needed and to perform the roadside drone service. In some examples, after the drone arrives at the location where roadside drone service is needed, the drone may be controlled by a decentralized controller (e.g., an edge server) to cause the drone to perform the appropriate roadside drone service. After the drone completes the roadside service, the drone may transmit a signal to the server 102 indicating that the roadside drone service has been completed, which can be received by the drone service management module 230.

Figure 6:
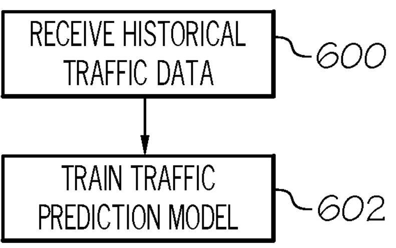
FIG. 6 depicts a flowchart of a method of training a traffic prediction model, according to one or more embodiments shown and described herein.

FIG. 6 depicts a flowchart of an example method for training a traffic prediction model. At step 600, the historical traffic data reception module 214 receives historical traffic data. The historical traffic data may comprise positions, velocities, accelerations, trajectories, and other data associated with vehicles and other road agents. The historical traffic data may also comprise data about roads, weather, and the like. The historical traffic data may comprise traffic data at a plurality of locations at a plurality of times. In particular, the historical traffic data may comprise traffic data associated with different time steps that indicate the flow of traffic patterns at different locations over time. In some embodiments, the historical traffic data reception module 214 may receive information about scheduled projects about roads, for example, scheduled constructions on roads, detour information, a number of lanes that will be closed, and the like. The information about scheduled projects may be obtained from state or local governments or any other publicly available information online.

At step 602, the traffic prediction training module 216 trains the traffic prediction model to predict one or more future traffic states based on one or more current traffic states. In particular, the traffic prediction training module 216 may use the historical traffic data received by the historical traffic data reception module 214 to train the traffic prediction model to predict future traffic states based on current traffic states. In some examples, the traffic prediction model may be a neural network and the traffic prediction training module 216 may train the neural network using machine learning techniques. In some embodiments, the traffic prediction training module 216 trains the traffic prediction model to predict one or more future traffic states further based on information about scheduled projects about roads.

Figure 7:
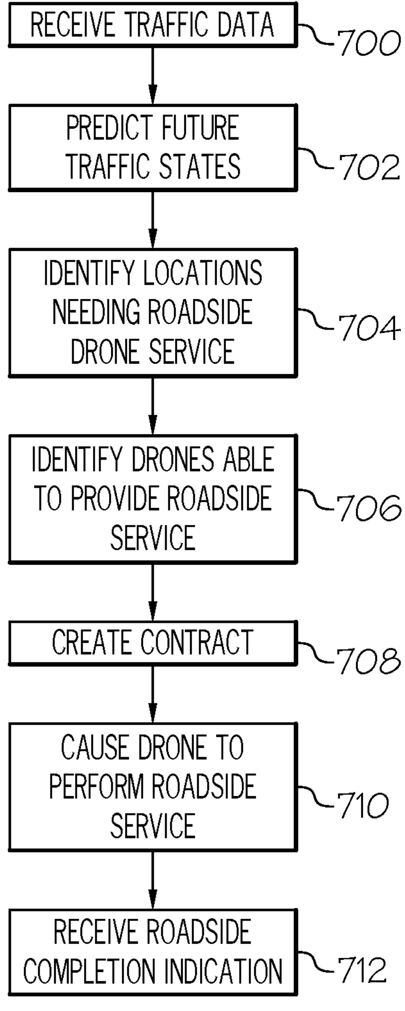
FIG. 7 depicts a flowchart of a method of performing roadside drone service, according to one or more embodiments shown and described herein.

FIG. 7 depicts a flowchart of an example method for providing roadside drone service. At step 700, the traffic data reception module 220 receives traffic data indicating a current traffic state at one or more locations. The traffic data may comprise images or other types of data that capture traffic information. In some examples, the traffic data may be received from traffic infrastructure (e.g., the traffic camera 104 of FIG. 1) and/or connected vehicles (e.g., the connected vehicles 106, 108, 110 of FIG. 1).

At step 702, the traffic state prediction module 222 predicts a future traffic state at one or more locations based on the current traffic data received by the traffic data reception module 220. In embodiments, the traffic state prediction module 222 may utilize the traffic prediction model trained by the traffic prediction training module 216 to predict future traffic states. In particular, the traffic state prediction module 222 may input current traffic data into the trained traffic prediction model, and the model may output predicted future traffic states at one or more locations. In some examples, the traffic state prediction module 222 may predict future traffic states at one or more locations based on the current date and time.

At step 704, the required service identification module 224 identifies one or more locations where roadside drone service is expected to be needed based on the future traffic states predicted by the traffic state prediction module 222. In particular, the required service identification module 224 may identify future traffic states predicted by the traffic state prediction module 222 that may benefit from roadside drone service. For example, the required service identification module 224 may identify a location predicted to have a traffic jam in the near future that may benefit from drones providing a traffic break at the location.

At step 706, the drone identification module 226 identifies one or more drones that are able to provide the roadside drone service identified by the required service identification module 224. In particular, the required service identification module 224 may identify desired capabilities of a drone to provide certain roadside drone services. The drone identification module 226 may then identify one or more drones that have the desired capabilities. In some examples, the drone identification module 226 may identify drones suitable for performing a roadside drone service identified by the required service identification module 224 based on registration information received by the drone registration module 218. That is, the drone identification module 226 may match desired capabilities of drones for performing a roadside drone service with registered drones having the desired capabilities.

At step 708, the contract creation module 228 creates a contract for a drone identified by the drone identification module 226 to perform a roadside drone service identified by the required service identification module 224. If the drone identification module 226 identifies more than one drone that is able to perform a particular roadside drone service identified by the required service identification module 224, the contract creation module 228 may select, and create a contract with, the drone that best meets a particular category. For example, the contract creation module 228 may select the drone having the lowest cost, or the most sophisticated equipment, or that can reach the location where roadside drone service is to be performed in the shortest amount of time.

At step 710, the drone service management module 230 causes the drone for which a contract was created by the contract creation module 228 to travel to the location identified by the required service identification module 224 where roadside drone service is needed and perform the roadside drone service. At step 712, after the drone performs the roadside drone service, the drone may transmit a signal to the server 102 indicating that the roadside drone service has been completed. This signal may be received by the drone service management module 230.

It should now be understood that embodiments described herein are directed to methods and systems for performing roadside drone service. A server may receive traffic data indicate a current traffic state at one or more locations. The server may use a trained traffic prediction model to predict future traffic states at one or more locations based on the current traffic states. The server may identify locations having traffic states for which roadside drone service may be helpful. The server may identify one or more drones able to provide the appropriate roadside drone service at the identified locations. The server may automatically create a contract for the identified one or more drones and the one or more drones may perform the appropriate roadside drone service.

As such, the server may identify locations where traffic problems are likely to occur in the future before the problems arise. The server may then automatically identify drones that are able to provide the appropriate roadside drone service to alleviate such problems and automatically create contracts for the drones to perform the roadside drone service. Thus, the drones may help alleviate traffic problems before an accident happens. Drones may be able to provide roadside services quicker or more efficiently than police, ambulances, or other ground vehicles since drones do not have to deal with traffic.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:

storing data associating a plurality of traffic states with respective types of roadside drone services;

receiving traffic data indicating current traffic states at one or more road locations;

predicting future traffic states at each of the one or more road locations based on the current traffic states;

determining whether any of the predicted future traffic states at the one or more road locations match any of the plurality of traffic states in the stored data; and upon determination that a first predicted future traffic state matches a first traffic state in the stored data:

identifying a first unmanned aerial vehicle that is able to provide a first roadside drone service associated with the first traffic state; and causing the first unmanned aerial vehicle to travel to a road location of the first traffic state to perform the first roadside drone service.

2. The method of claim 1, further comprising:

receiving a current date and time;

predicting one or more future traffic states at the one or more road locations based on the current date and time; and predicting the first road location where roadside drone service is expected to be needed based on the one or more future traffic states.

3. The method of claim 1, further comprising:

predicting, by a trained traffic prediction model, one or more future traffic states at the one or more road locations based on the current traffic states; and predicting the first road location where roadside drone service is expected to be needed based on the one or more future traffic states.

4. The method of claim 3, further comprising:

receiving historical traffic data; and training the traffic prediction model to predict future traffic states at one or more first road locations based on current traffic states at one or more second road locations.

5. The method of claim 4, further comprising training the traffic prediction model using one or more machine learning algorithms.

6. The method of claim 1, further comprising:

identifying a first unmanned aerial vehicle that is suitable to perform the first roadside drone service; and creating a contract for the first unmanned aerial vehicle to perform the first roadside drone service.

7. The method of claim 1, further comprising:

receiving registration data associated with one or more registered unmanned aerial vehicles indicating performance capabilities of the one or more unmanned aerial vehicles;

determining one or more first performance capabilities required to perform the first roadside drone service;

identifying one or more of the registered unmanned aerial vehicles having the first performance capabilities based on the registration data; and creating a contract for the identified one or more of the registered unmanned aerial vehicles having the first performance capabilities to perform the first roadside drone service.

8. The method of claim 7, further comprising:

determining whether a plurality of the one or more registered unmanned aerial vehicles have the first performance capabilities based on the registration data; and upon determination that a plurality of the one or more registered unmanned aerial vehicles have the first performance capabilities:

selecting one of the plurality of the one or more registered unmanned aerial vehicles having the first performance capabilities; and creating the contract with the selected one of the one or more registered unmanned aerial vehicles to perform the first roadside drone service.

9. The method of claim 8, further comprising:

selecting the one of the plurality of the one or more registered unmanned aerial vehicles able to perform the first roadside drone service at a lowest cost.

10. The method of claim 8, further comprising:

selecting the one of the plurality of the one or more registered unmanned aerial vehicles able to reach the first road location in a shortest amount of time.

11. The method of claim 1, wherein the first roadside drone service comprises creating a traffic break.

12. The method of claim 1, wherein the first roadside drone service comprises removing debris.

13. The method of claim 1, wherein the first roadside drone service comprises working cooperatively with roadside personnel.

14. The method of claim 1, wherein the first roadside drone service comprises bringing equipment or supplies to roadside personnel.

15. A remote computing device comprising:

a processor configured to:

store data associating a plurality of traffic states with respective types of roadside drone services;

receive traffic data indicating current traffic states at one or more road locations;

predict future traffic states at each of the one or more road locations based on the current traffic states;

determine whether any of the predicted future traffic states at the one or more road locations match any of the plurality of traffic states in the stored data; and upon determination that a first predicted future traffic state matches a first traffic state in the stored data:

identify a first unmanned aerial vehicle that is able to provide a first roadside drone service associated with the first traffic state; and cause the first unmanned aerial vehicle to travel to a road location of the first traffic state to perform the first roadside drone service.

16. The remote computing device of claim 15, wherein the processor is further configured to:

predict, by a trained traffic prediction model, one or more future traffic states at the one or more road locations based on the current traffic states; and predict the first road location where roadside drone service is expected to be needed based on the one or more future traffic states.

17. The remote computing device of claim 16, wherein the processor is further configured to:

receive historical traffic data; and train the traffic prediction model to predict future traffic states at one or more first road locations based on current traffic states at one or more second road locations.

18. The remote computing device of claim 15, wherein the processor is further configured to:

identify a first unmanned aerial vehicle that is suitable to perform the first roadside drone service; and create a contract for the first unmanned aerial vehicle to perform the first roadside drone service.

19. The remote computing device of claim 15, wherein the processor is further configured to:

receive registration data associated with one or more registered unmanned aerial vehicles indicating performance capabilities of the one or more unmanned aerial vehicles;

determine one or more first performance capabilities required to perform the first roadside drone service;

identify one or more of the registered unmanned aerial vehicles having the first performance capabilities based on the registration data; and create a contract for the identified one or more of the registered unmanned aerial vehicles having the first performance capabilities to perform the roadside drone service.

20. The remote computing device of claim 19, wherein the processor is further configured to:

determine whether a plurality of the one or more registered unmanned aerial vehicles have the first performance capabilities based on the registration data; and upon determination that a plurality of the one or more registered unmanned aerial vehicles have the first performance capabilities:

select one of the plurality of the one or more registered unmanned aerial vehicles having the first performance capabilities; and create the contract with the selected one of the one or more registered unmanned aerial vehicles to perform the first roadside drone service.

* * * * *